United States Patent [19]

Suzuki et al.

[11] Patent Number: 4,527,206
[45] Date of Patent: Jul. 2, 1985

[54] APPARATUS FOR CONTROLLING BRAKING OPERATION OF A MAGNETIC TAPE TRANSPORT

[75] Inventors: Shigeru Suzuki; Kazumasu Tsutsumi, both of Hamamatsu, Japan

[73] Assignee: Nippon Gakki Seizo Kabushiki Kaisha, Hamamatsu, Japan

[21] Appl. No.: 272,651

[22] Filed: Jun. 11, 1981

[30] Foreign Application Priority Data

Jun. 27, 1980 [JP] Japan ............................... 55-87528
Jun. 27, 1980 [JP] Japan ............................... 55-87529

[51] Int. Cl.³ ...................... G11B 15/18; G11B 15/22
[52] U.S. Cl. ................................. 360/71; 360/74.1; 242/204
[58] Field of Search ........................ 360/71, 72.3, 74.2, 360/74.5, 73, 74.1, 61, 62, 137; 242/204; 318/269, 372

[56] References Cited

U.S. PATENT DOCUMENTS

| | | | |
|---|---|---|---|
| 3,218,397 | 11/1965 | Pastor | 360/137 |
| 4,156,257 | 5/1979 | Roberts | 360/74.3 X |
| 4,263,631 | 4/1981 | Takanashi | 360/71 X |
| 4,301,481 | 11/1981 | Suzuki | 360/74.1 X |
| 4,318,139 | 3/1982 | Shibata et al. | 360/71 |
| 4,331,986 | 5/1982 | Mori | 360/74.4 X |
| 4,336,560 | 6/1982 | Matsumoto | 360/137 |
| 4,373,170 | 2/1983 | Suraga et al. | 360/71 |

FOREIGN PATENT DOCUMENTS

WO81/01902 7/1981 PCT Int'l Appl. .

Primary Examiner—Raymond F. Cardillo, Jr.
Assistant Examiner—Steven R. Garland
Attorney, Agent, or Firm—Spensley Horn Jubas & Lubitz

[57] ABSTRACT

An apparatus for controlling the transport of a magnetic tape in a tape recorder or like devices, arranged so that a braking force is applied only for a predetermined length of time to reel stands carrying tape reels either when the tape transport is to be stopped or when a speed of the tape transport is to be reduced to thereby mitigate the consumption of electric power required for the braking action, the apparatus also eliminates the provision of a special operation for stopping the transport of the magnetic tape which, otherwise, is required for switching from high-speed run to normal-speed run of the tape.

19 Claims, 2 Drawing Figures

APPARATUS FOR CONTROLLING BRAKING OPERATION OF A MAGNETIC TAPE TRANSPORT

BACKGROUND OF THE INVENTION (a) Field of the Invention

The present invention relates to an apparatus for controlling the transport of a magnetic tape in a tape recorder, a video tape recorder and like devices, which is arranged so that a braking force is applied to the reel stands only for a predetermined period of time upon generation of a stop command signal, to bring the running magnetic tape to a halt.

(b) Description of the Prior Art

In conventional tape recorders, the transport of a magnetic tape, i.e. normal play, fast forward feed and rewind, is brought to a halt not only by shutting off the driving of the reel stands, but also by application of a braking force to the reel stands on both the feed side and the take-up side through a braking mechanism to quickly stop the rotation of these reel stands, to prevent an extra travel of the tape due to its inertia of movement.

Among the conventional braking mechanisms of the so-called electromagnetic drive type designed for driving the mechanism by solenoid means, there are the following two types. One of them is arranged so that the mechanism is normally held in the state that a braking force is being applied to the mechanism by spring means, and this braking action is prevented only when an electric power is supplied to the solenoid means. The other type is opposite to the above-mentioned manner of operation. That is, mechanism is normally held, by spring means, in the state of being released of braking force, and it is only when an electric power is supplied to the solenoid means that a braking force is applied to the mechanism.

In the first-mentioned type of braking mechanism, electric power has to be applied continuously to the solenoid means throughout the period of transport of the magnetic tape. On the other hand, the latter type of braking mechanism requires that electric power be supplied continuously to the solenoid means throughout the period of rest of the magnetic tape. In each of these two types of braking mechanisms, therefore, it will be appreciated that, in the ordinary manner of use of the tape recorder, electric power has to be supplied to the solenoid means continuously for an extended period of time, and thus there has been the drawback that the consumption of power supply is considerably large.

Also, in the conventional ordinary tape recorders, in either the fast-feed mode or rewinding mode wherein the tape is forced to run at a high speed by rotating the shafts of the reel stands at a high speed, if the user wants to instantaneously switch this mode over to either the playback mode or the recording mode wherein the magnetic tape is caused to run at a constant normal speed between a pinch roller and a capstan, the tape is subjected, at the very time of the switching, to a large tension in that portion of the tape locating between the take-up side and the pinch roller side, and as a result there is the fear that the tape is elongated or cut apart. For this reason, the above-mentioned conventional tape recorders having a high potential of such fears as described above, there is provided a mechanical interlocking means in the operating mechanism of the tape recorder, to insure that, when the recorder is in its fast-feed mode or rewind mode, the reproduction button cannot be actuated unless after the stop button is depressed. In those tape recorders which are not provided with such interlocking means as mentioned above, instruction notes are usually provided for the user to practice so as not to depress the reproduction button abruptly when the machine is in its fast-feed mode or rewind mode, and to depress the stop button before depressing these operating buttons.

Anyway, the conventional operation pattern which requires the user to first perform an operation to bring the running tape to a halt when the user wants to changeover from the fast-feed mode or the rewind mode to either the playback mode or the recording mode, and then to perform a further operation to start either the playback or the recording, cannot be termed as being convenient in its operability.

SUMMARY OF THE INVENTION

It is, therefore, a primary object of the present invention to provide an apparatus for causing and stopping the transport of a magnetic tape, which reduces the amount of consumption of electric power required for the braking action of the braking mechanism.

Another object of the present invention is to provide an apparatus of the type as described above, which is arranged so that, when a command signal for stopping the running tape is generated during the transport of the tape, a braking force is applied to tape reel stands only for a predetermined period of time.

Still another object of the present invention is to provide an apparatus of the type as described above, which is arranged so that, when the user manipulates an operating button to generate a command signal for starting a constant low-speed transport of the tape in the midst of a high-speed run of the tape, there automatically arises a braking action for the apparatus for a predetermined length of time, to thereby keep the tape from being subjected to an undesirably strong tension.

DETAILED DESCRIPTION OF THE PREFERRED EMBODIMENTS

Figure 1:
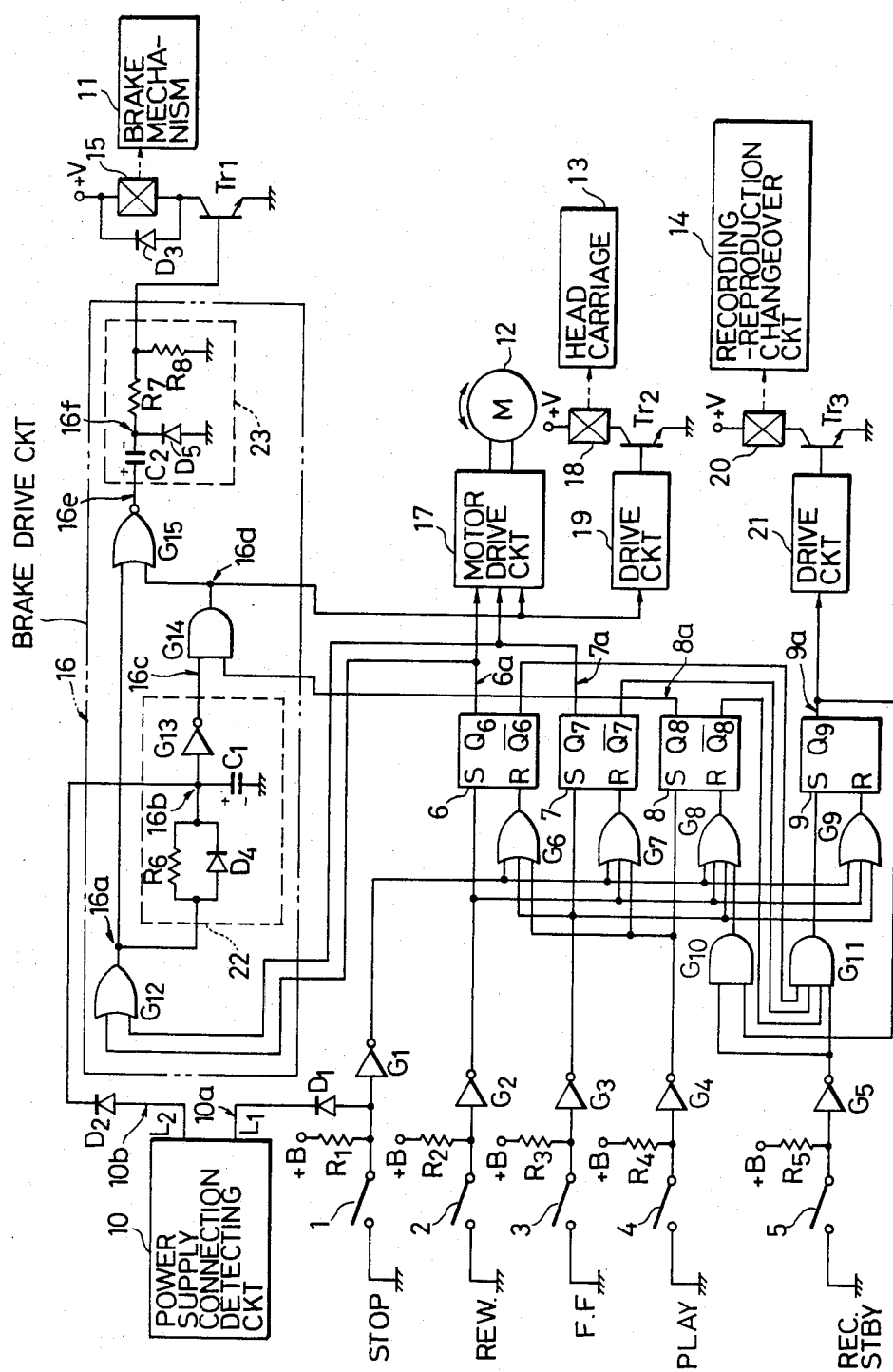
FIG. 1 is a block diagram showing an embodiment of the control circuit of a tape recorder to which is applied the present invention.

In FIG. 1, reference numeral 1 represents a stop switch indicated as STOP, 2 a rewind switch REW., 3 a fast forward feed switch F.F, 4 a playback switch PLAY, and 5 a recording standby switch REC.STBY. These operating switches 1 to 5 are push-button switches of the self-return or momentary type. One terminal of each of these operating switches is grounded, and the other terminal is connected to a positive power supply +B via pull-up resistors $R_1$ to $R_5$. The switching outputs due to the on-off actions of the respective operating switches 1 to 5 are derived from the inverters $G_1$ to $G_5$, respectively.

Four flip-flops 6 to 9 are controlled in a manner as will be described later, by the switching outputs derived from the respective inverters $G_1$ to $G_5$ via circuits constructed with OR gates $G_6$ to $G_9$ and AND gates $G_{10}$ and $G_{11}$. On the basis of the outputs of these flip-flops 6 to 9, a braking mechanism 11 for tape reel stands carrying tape reels, a reel motor 12, a head carriage 13 and a recording-playback changeover circuit 14 are controlled.

The braking mechanism 11 is associated with a solenoid 15, and is arranged so that when an electric power is supplied to the solenoid 15, the braking mechanism 11 is actuated so that it applies a braking force to those reel stands provided on the supply reel side and on the takeup reel side. The solenoid 15 is driven by an output of an output transistor $Tr_1$ of a brake-driving circuit 16 which uses, as its inputs, signals $6a$, $7a$ and $8a$ supplied from output terminals $Q_6$, $Q_7$ and $Q_8$ of the flip-flops 6, 7 and 8. A diode $D_3$ is intended for the absorption of reverse voltage generating power produced in the solenoid 15.

The reel motor 12 is coupled to the tape reels to drive them for rotation. This reel motor 12 is controlled in its four modes of rotation, i.e. stop, low-speed forward rotation, high-speed forward rotation, and high-speed reverse rotation, by the outputs of a motor-driving circuit 17. To this motor-driving circuit 17 is delivered a high-speed reverse rotation command signal which is the signal $6a$ supplied from the output terminal $Q_6$ of the flip-flop 6, and a high-speed forward rotation command signal which is the signal $7a$ supplied from the output terminal $Q_7$ of the flip-flop 7, and also a low-speed forward rotation command signal which is a signal $16d$ (which is also called a normal run signal) supplied from the AND gate 14 provided in said brake-driving circuit 16 and receiving, as one of the inputs, the signal $8a$ supplied from the output terminal $Q_8$ of the flip-flop 8. When all of these rotation command signals $6a$, $7a$ and $16d$ are in the low level "L" in binary levels, the reel motor 12 is not driven for rotation.

The head carriage 13 is a mechanism equipped with one or more magnetic heads and pinch rollers both of which are not shown, and operates to urge the magnetic heads and the pinch rollers against a magnetic tape as well as toward a capstan of a capstan motor not shown (which is called the playback position) at the time of recording or playback, and also to cause both the magnetic heads and the pinch rollers to depart away from their engagement with the magnetic tape and the capstan at the time of other operation modes and at the rest time (which is called the returned position). The actuation of the head carriage 13 is performed by a solenoid 18. This solenoid 18 is driven by an output of an output transistor $Tr_2$ provided in a drive circuit 19 and using said normal travel signal $16d$ as its input. When said signal $16d$ is in the high level "H" in the binary levels, the transistor $Tr_2$ is rendered conductive to supply an electric power to the solenoid 18, so that the head carriage 13 is actuated to provide for said playback position.

The recording-playback changeover circuit 14 is a circuit network for switching the connections between an erasing head, a recording head, a playback head, a bias oscillator, an input circuit and an output circuit, to thereby effect changeover between the recording state in which an input signal is recorded on the magnetic tape and the playback state in which the signal recorded on the magnetic tape is reproduced. The changeover switches not shown in said circuit 14 are driven by a solenoid 20. This solenoid 20 is driven by an output of an output transistor $Tr_3$ provided in a drive circuit 21 and using, as its input, a signal $9a$ delivered from the output terminal $Q_9$ of the flip-flop 9. When said signal $9a$ is in its high level "H" in the binary levels, the transistor $Tr_3$ is rendered conductive so that an electric power is supplied to the solenoid 20, whereby said changeover circuit 14 is rendered to the recording mode. Also, when the signal $9a$ is in its low level "L", the changeover circuit 14 is rendered to its playback mode.

A power supply connection detecting circuit 10 is a circuit for detecting the connection of the tape recorder to the power supply, and to initialize the control circuit, i.e. to orientate the apparatus toward a specific circuit condition. That is, a signal $10a$ derived from a terminal $L_1$ which is connected to the input side of the inverter $G_1$ via the diode $D_1$ becomes "L" only for a trifle length of time immediately following the connection of the tape recorder to the power supply, and via the inverter $G_1$ and OR gates $G_6$ to $G_9$, said signal $10a$ resets all of the flip-flops 6 to 9. Also, a signal $10b$ derived from a terminal $L_2$ which is connected to an inverter $G_{13}$ of the brake drive circuit 16 via a diode $D_2$ is held at "H" for a certain length of time $T_1$ immediately after the connection of the tape recorder to the power supply.

Though not shown, the capstan motor which is intended to cause the magnetic tape to make a constant-speed normal travel either at the time of recording or at the time of playback is driven by connecting the tape recorder to the power supply.

The brake driving circuit 16 is constructed with: an OR gate 12 which uses, as its input signals, the signal $6a$ supplied from the output terminal $Q_6$ of the flip-flop 6 and the signal $7a$ derived at the output terminal $Q_7$ of the flip-flop 7; a delay circuit 22 using, as its input, the signal $16a$ outputted from said OR gate 12 and being comprised of a resistor $R_6$, a diode $D_4$, a capacitor $C_1$ and an inverter $G_{13}$; an AND gate $G_{14}$ which uses, as its inputs, an output signal $16c$ of said delay circuit 22 and the signal $8a$ derived at the output terminal $Q_8$ of the flip-flop 8; a NOR gate $G_{15}$ which uses, as its inputs, the output signal $16d$ of said AND gate $G_{14}$ and an output signal $16a$ of said OR gate $G_{12}$; and a charge-discharge circuit 23 which receives an output signal $16e$ of said NOR gate $G_{15}$ to drive the transistor $Tr_1$ and being constructed with a differential circuit comprised of a capacitor $C_2$, a diode $D_5$, and resistors $R_7$ and $R_8$.

Figure 2:
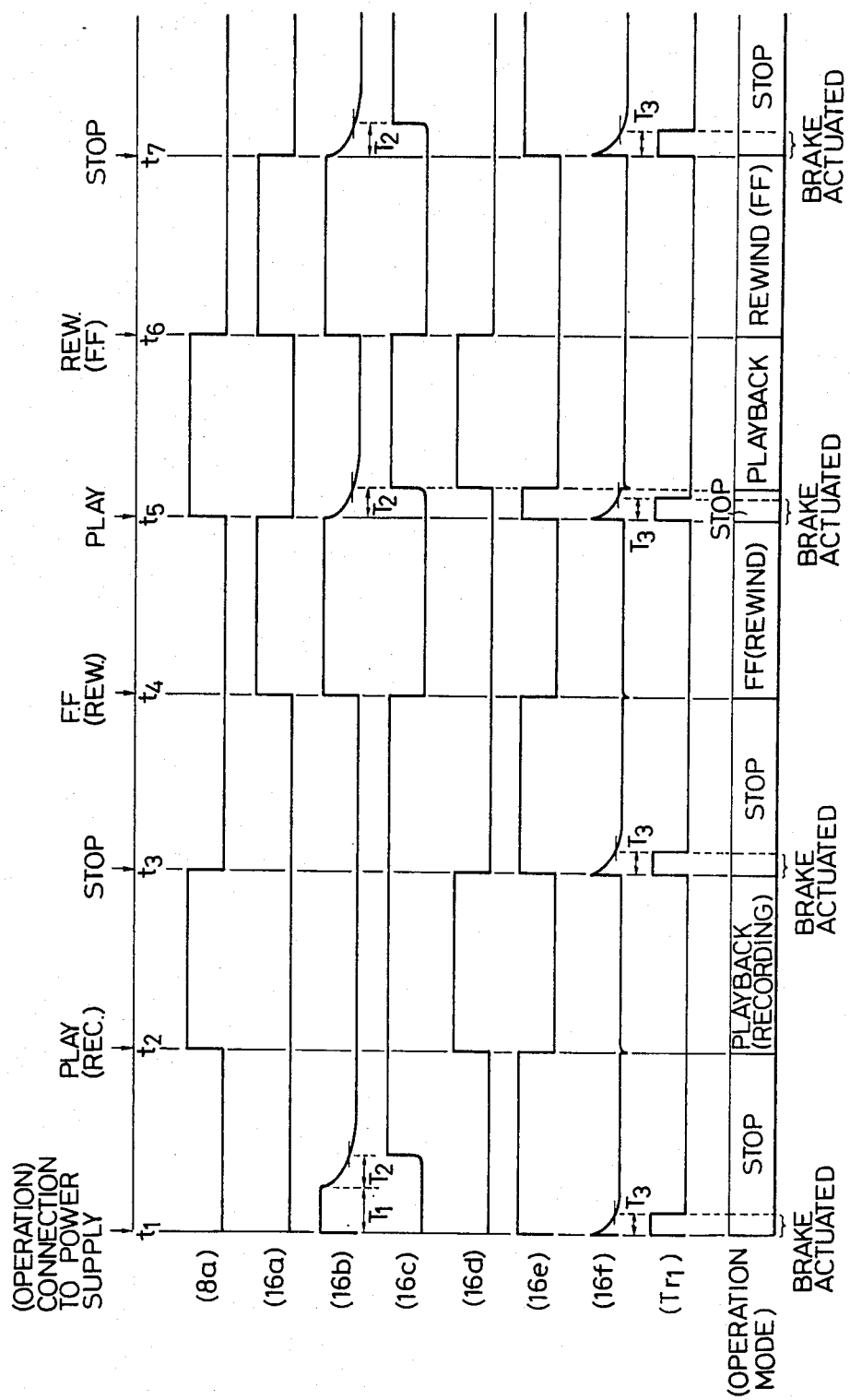
FIG. 2 is a time chart for respective parts of the apparatus for showing an example of the operation of the control circuit mentioned above.

Description will hereunder be made of the operation of said delay circuit 22 by referring to the time chart shown in FIG. 2.

When the output signal $16a$ of the OR gate 12 rises from "L" to "H" (time at $t_4$ in FIG. 2), the capacitor $C_1$ is momentarily charged up through the diode $D_4$, and accordingly the charged voltage $16b$ thereof also assumes a high level momentarily. As a result, the output signal $16c$ of the inverter $G_{13}$ will become "L" at the same time therewith. Next, when the signal $16a$ of the OR gate $G_{12}$ drops to "L" (at time $t_5$ in FIG. 2), the charge of the capacitor $C_1$ is gradually discharged through the resistor $R_6$ and the OR gate $G_{12}$, and the voltage $16b$ reduces gradually. At the lapse of time $T_2$, the voltage $16b$ will assume a value less than the threshold value of the inverter $G_{13}$, and the output signal $16c$ of this inverter will rise to "H". In other words, the delay circuit 22 serves to cause a delay, only for the length of time $T_2$, of the drop of the input signal $16a$ from "H" to "L", and inverts the logic level thereof to derive an output signal $16c$.

Next, description will be made of the operation of the charge-discharge circuit 23 by giving reference to FIG. 2.

When the output signal 16e of the NOR gate $G_{15}$ rises from "L" to "H" (at time $t_3$ in FIG. 2), there will flow a charge current from the NOR gate $G_{15}$ side to the capacitor $C_2$ through the resistors $R_7$ and $R_8$ and through the base of the transistor $Tr_1$. As such time, the voltage 16f at the connecting point of the capacitor $C_2$ and the resistor $R_7$ will, as shown in FIG. 2, momentarily respond to the rise of the output signal 16e to "H" to assume high level. Thereafter, as the capacitor $C_2$ is charged up, this level will gradually drop accordingly. Throughout the period of time when the voltage 16f is held at a value above a certain level (shown at time $T_3$ in FIG. 2), the transistor $Tr_1$ remains conductive. In other words, the charge-discharge circuit 23 causes the transistor $Tr_1$ to become conductive for a certain length of time $T_3$ starting at the time when the output signal 16e of the NOR gate $G_{15}$ has risen to "H", to thereby drive the solenoid 15. This driving time $T_3$ is set slightly shorter than the delay time $T_2$ of the delay circuit 22 ($T_3 < T_2$). When the output signal 16e of the NOR gate $G_{15}$ falls down to "L", the charge of the capacitor $C_2$ is discharged through the diode $D_5$ and through the NOR gate $G_{15}$.

Next, description will be made of the successive sequence of operations of the control circuit having the abovesaid arrangement by referring to the time chart of FIG. 2.

Let us here suppose that the tape recorder is connected to the power supply at time $t_1$. Whereupon, as stated above, a signal 10a which is outputted from the terminal $L_1$ of the power supply connection detecting circuit 10 resets all of the respective flip-flops 6 to 9. As a result, the signals 6a to 9a of the output terminals $Q_6$ to $Q_9$ will invariably become "L", and the signal 16d of the AND gate $G_{14}$ will become "L", and the output signal 16e of the NOR gate $G_{15}$ will become "H". Accordingly, the charge-discharge circuit 23, upon its receipt of the "H" level signal 16e, functions as stated above, so that the transistor $Tr_1$ is rendered conductive only for a certain length of time $T_3$ starting at time $t_1$, and thus electric power is supplied to the solenoid 15. Whereby, the braking mechanism 11 is rendered operative only for this period of time. Also, as will be noted, the input signals 6a, 7a and 16d of the motor driving circuit 17 are invariably of "L" level. Accordingly, the reel motor 12 is not driven. In a similar way, since the input signal 16d of the driving circuit 19 is of "L" level, no power is supplied to the solenoid 18, and the head base 13 is its return position. Also, the input signal 9a of the driving circuit 21 is in "L" level, so that no power is supplied to the solenoid 20, and therefore, the recording-reproducing changeover circuit 14 is now in its reproducing mode.

It should be understood that, as shown at 16b of FIG. 2, by an output signal 10b delivered from the terminal $L_2$ of the power supply connection detecting circuit 10, the terminal voltage 16b of the capacitor $C_1$ in the delay circuit 22 is held at "H" for the length of time $T_1$ starting at time $t_1$, so that the output signal 16c of the inverter $G_{13}$ becomes "L". Upon lapse of time $T_1$, the signal 10b from the terminal $L_2$ disappears, and the output signal 16c of the inverter $G_{13}$ will become "H" at the lapse of a delay time $T_2$ by the delay circuit 22. In short, the output signal 16c of the delay circuit 22 will become "H" for the first time upon lapse of time ($T_1 + T_2$) after the connection of the apparatus to the power supply.

Next, by closing the playback switch 4 at time $t_2$, the flip-flop 8 is set by an output of the inverter $G_4$, so that the signal 8a becomes "H". At the same time therewith, the flip-flops 6 and 7 are applied with a resetting input. At such time, the output signal 16c of the delay circuit 22 has already become "H", and it will be understood that, by the fact that the signal 8a has become "H", the normal transport command signal 16d from the AND gate $G_{14}$ will become "H". When this signal 16d becomes "H", the reel motor 12 is driven to make a low-speed forward rotation. Concurrently therewith, electric power is supplied to the solenoid 18, and as a result, the head carriage 13 is shifted to the record-playback position. In short, the magnetic tape is caused to run at a normal speed by means of the capstan and the pinch roller, and is taken up by the takeup reel which is driven by the reel motor 12 which is rotated forwardly at a low speed. As such time, the flip-flop 9 is in its reset state, and the signal 9a derived at its output terminal $Q_9$ is in "L" level, so that the recording-playback changeover circuit 14 is in its playback mode. Thus, the tape recorder is caused to perform a playback operation.

Next, by momentarily closing the stop switch 1 at time $t_3$, the flip-flop 8 is reset by an output of the inverter $G_1$, and its output signal 8a becomes "L". Concurrently therewith, a resetting input is applied also to the flip-flops 6, 7 and 9. Owing to the fact that the signal 8a has become "L", the normal transport command signal 16d becomes "L", and the reel motor 12 ceases to be driven. At the same time therewith, the head carriage 13 returns to its return position, and the driving of the tape is suspended. Also, due to the fact that the signal 16d becomes, "L", the output signal 16e of the NOR gate $G_{15}$ becomes "H". As a result, electric power is supplied to the solenoid 15 only for a certain length of time $T_3$ through the charge-discharge circuit 23 and through the transistor $Tr_1$, so that the braking mechanism 11 is actuated for this length of time. As a result, the reels are unfailingly brought to a halt. Electric power is supplied only for a relatively short certain period of time $T_3$ to the solenoid 15, so that no power consumed after the reels have stopped their motion.

Next, by momentarily closing the fast forward switch 3 at time $t_4$, the flip-flop 7 is set by an output of the inverter $G_3$, so that the signal 7a thereof becomes "H". Concurrently therewith, the flip-flops 6, 8 and 9 also are supplied with a resetting input. By the fact that the signal 7a has become "H", the motor driving circuit 17 will cause the reel motor 12 to make forward rotation at a high speed. Whereby, the tape recorder will make a fast forward operation. Also, by the fact that the signal 7a becomes "H", the output signal 16a of the OR gate $G_{12}$ becomes "H", and accordingly the output signal 16e of the NOR gate $G_{15}$ becomes "L". Accordingly, the charge of the capacitor $C_2$ is instantaneously discharged. Furthermore, owing to the fact that the signal 16a becomes "H", the capacitor $C_1$ in the delay circuit 22 is instantaneously charged up, so that the signal 16b will become "H". Accordingly, the output signal 16c of the inverter $G_{13}$ will become "L".

Next, by momentarily closing the playback switch 4 at time $t_5$ during the fast forward mode operation, the flip-flop 8 is set by an output of the inverter $G_4$, and accordingly the signal 8a thereof becomes "H", and concurrently therewith the flip-flop 7 is reset, so that the signal 7a thereof becomes "L". Concurrently therewith, a resetting signal is inputted to the flip-flop 6 also. Whereupon, from the fact that the signal 7a has become "L", the high-speed driving of the reel motor 12 ceases. Then, the output signal 16a of the OR gate $G_{12}$ become "L", and the output signal 16c of the delay circuit 22 will become "H" upon lapse of time $T_2$. However, during the period of time from time $t_5$ to the lapse of time $T_2$, the signal 16c remains "L". Therefore, even when the signal 8a becomes "H" at time $t_5$, the output 16d of the AND gate $G_{14}$ remains "L". Accordingly, for the length of time from time $t_5$ to the time $(t_5+T_2)$, the output 16e of the NOR gate $G_{15}$ is in its "H" level. Because of this, the solenoid 15 is connected to the power supply only for a length of time $T_3$ starting at time $t_5$ through the charge-discharge circuit 23 and the transistor $Tr_1$. Only for this length of time, the braking mechanism 11 is actuated, to swiftly cause the reel stands to stop their motion. When the time $(t_5+T_2)$ arrives, the output signal 16c of the delay circuit 22 becomes "H", and accordingly the normal transport command signal 16d from the AND gate $G_{14}$ becomes "H". With this, the motor driving circuit 17 causes the reel motor 12 to make forward rotation at a low speed. Concurrently therewith, the driving circuit 19 actuates the head carriage 13 to shift same to the record-playback position. Whereby, the tape recorder will perform a playback operation. In short, the running magnetic tape is brought to a halt form its high-speed run, and thereafter it is smoothly caused to make a normal-speed travel. Thus, no undesirable tension is applied to the magnetic tape. It should be noted here that as the signal 16d becomes "H", the signal 16e will become "L".

Next, during the reproducing mode of operation as stated above, let us assume that the rewind switch 2 is momentarily closed at time $t_6$. Whereupon, the flip-flop 6 is set by an output of the inverter $G_2$, causing the signal 6a thereof to become "H". Concurrently therewith, the flip-flop 8 is reset, so that the signal 8a thereof becomes "L". At the same time therewith, the flip-flops 7 and 9 are applied with a resetting signal. Owing to the fact that the signal 8a becomes "L", the output signal 16d of the AND gate $G_{14}$ becomes "L", and owing to the fact that the signal 6a, on the other hand, becomes "H", the reel motor 12 is switched over to a high-speed reverse rotation. Also, the head carriage 13 is returned to the return position. Whereby, the tape recorder will perform a rewinding operation.

Next, by momentarily closing the stop switch 1 at time $t_7$, the flip-flop 6 is reset by an output of the inverter $G_1$, so that the signal 6a thereof becomes "L". At the same time therewith, the flip-flops 7, 8 and 9 are also applied with a resetting signal. Owing to the fact that the signal 6a becomes "L", the driving of the reel motor 12 ceases. Concurrently therewith, the output signal 16a of the OR gate $G_{12}$ becomes "L", and accordingly the output signal 16e of the NOR gate $G_{15}$ becomes "H". Whereby, through the charge-discharge circuit 23 and the transistor $Tr_1$, the solenoid 15 is connected to the power supply only for a time $T_3$. Accordingly, the braking mechanism 11 is rendered operative only for this length of time to quickly bring the reel stands to a halt.

In order to cause the tape recorder to perform a recording operation, it is necessary to momentarily close the recording standby switch 5 during the state of the tape recorder that the respective flip-flops 6 to 9 are all reset. Whereupon, the flip-flop 9 is set through the inverter $G_5$ and through and AND gate $G_{11}$. As a result, the signal 9a thereof becomes "H". With this, the driving circuit 21 supplies electric power to the solenoid 20. Whereby, the recording-playback changeover circuit 14 will be switched over to the recording mode. In this state, let us assume that the playback switch 4 is momentarily closed. Whereupon, the flip-flop 8 is set so that its output signal 8a becomes "H". As a result, the magnetic tape will make the normal-speed travel which is exactly the same as that in the abovesaid playback operation, and thus the tape recorder performs a recording operation. As stated, both the recording operation and the playback operation are identical so far as the transport of the magnetic tape is connected. When the tape recorder is switched from the recording mode over to the stop mode, the braking mechanism 11 is actuated only for a certain length of time $T_3$.

The direction of rotation of the reel motor 12 in the fast forward mode is just the opposite of the direction of rotation in the rewinding mode. It should be understood, however, that the signals in the controlling system shown in FIG. 2 are exactly the same. Accordingly, when the tape recorder is switched over to the playback mode in the midst of rewinding mode, the braking mechanism 11 is actuated only for a certain length of time $T_3$. Thereafter, the playback operation commences. This pattern of operation is identical with the changeover from the fast forward mode over to the playback mode around time $t_5$.

Needless to say, the present invention is applicable to the tape recorders exclusively designed for recording or playback only, and to the tape-decks not equipped with an output amplifying system, or to video tape recorders, data recorders, and like devices.

What is claimed is:

1. An apparatus for controlling the transport of a recording tape in a tape transporting device, comprising:
    rotatable reel stands for carrying tape reels;
    a motor-driving circuit for driving a motor coupled to said reel stands;
    a braking mechanism for applying a braking force to at least one of said reel stands which are rotating, said braking mechanism including electromagnetic actuator means which are energized during the entire time of application of braking force;
    a brake-driving circuit for actuating said braking mechanism;
    an operating section for controlling the setting and changeover of transport modes of said tape;
    an information signal processing circuit for reproduction of contents recorded on said tape and for recording on said tape;
    the improvement wherein said brake driving circuit includes means for actuating said braking mechanism only for a predetermined certain length of time in response to operation of the operating section calling for either stopping the transport of said tape or reducing the transport speed of said tape, said braking driving circuit including a time-setting circuit for determining said predetermined certain length of time and for actuating said braking mechanism during said predetermined certain length of time and a gating circuit for driving said time-setting circuit in response to operation of the operating section calling for stopping the transport of the tape or reducing the transport speed of the tape.

2. An apparatus according to claim 1, wherein:
    said brake-driving circuit and operating section include means for providing command signals for controlling various functions of said apparatus, said command signals including a first command signal calling for stopping the transport of said tape, a second command signal calling for reducing the transport speed of said tape, a normal-speed transport command signal calling for normal speed transport of said tape and a high speed transport command signal calling for an increase in transport speed of said tape;

said time setting circuit is set to initiate the predetermined certain length of time and is reset to enable it to subsequently be set again; and said gating circuit drives said time-setting circuit by setting the time-setting circuit in response to either one of said first and second command signals, and resetting said time-setting circuit in response to either one of said normal-speed transport command signal calling for normal-speed transport and said high-speed transport command signal calling for an increase in the transport speed of said tape.

3. An apparatus according to claim 2, wherein said time-setting circuit is comprised of a differential circuit.

4. An apparatus according to claim 2, wherein said second command signal is supplied as a control signal to the motor driving circuit and wherein said brake-driving circuit further comprises:

a delay circuit which delays the provision of said second command signal for a period of time longer than the length of time set by said time-setting circuit before said second command signal is supplied to said motor-driving circuit.

5. An apparatus according to claim 4, wherein said delay circuit has an output and receives the high-speed transport command signal as an input, and wherein said gating circuit comprises:

inverting means for inverting the output of the delay circuit;

a first gate, enabled by the inverted signal of said high-speed transport command signal delayed by said delay circuit, for passing said normal-speed transport command signal; and a second gate for setting said time-setting circuit, said second gate receiving said high-speed transport command signal and said normal-speed transport command signal from said first gate.

6. An apparatus according to claim 5, wherein said first gate supplies said normal-speed transport command signal to said motor driving circuit.

7. An apparatus according to claim 5, further comprising:

a head carriage driving circuit for driving a carriage carrying an information processing head in response to said notmal-speed transport command signal from said first gate.

8. An apparatus according to claim 7, wherein said head carriage, when driven, urges said head and a pinch roller against said tape.

9. An apparatus according to claim 5, including means for causing said gating circuit to set, upon connection of the apparatus to a power supply, said time-setting circuit.

10. An apparatus according to claim 2 wherein the command signals include a command signal calling for a normal-speed transport of said tape when the tape is in a high-speed transport, said means for providing including means for generating said second command signal in response to said command signal calling for a normal-speed transport of said tape when the tape is in a high-speed transport.

11. An apparatus according to claim 10, wherein:

said high-speed transport command signal is for causing either one of a fast forward transport or a rewinding transport of said tape, and said normal-speed run command signal is for causing either one of a playback or a recording of said tape.

12. An apparatus according to claim 11, wherein the command signals include a signal calling for recording, further comprising:

a recording-playback changeover circuit for switching the connection of said information signal processing circuit over to a recording mode in response to a command signal calling for recording.

13. An apparatus according to claim 11, wherein said motor driving circuit makes a forward rotation of said motor at a low speed in response to said normal-speed transport command signal, and makes a forward rotation of said motor at a high speed in response to said fast forward transport command signal, and makes a reverse rotation of said motor at a high speed in response to said rewinding command signal.

14. A tape transport device, comprising:

rotatable reel stands for carrying tape reels;

at least one motor for driving the reel stands;

a brake mechanism for applying a braking force to at least one of the reel stands, said brake mechanism including electromagnetic actuator means which are energized during the entire time that the braking force is applied;

an operating section for controlling the operation of the transport device to provide stop, normal-speed and high-speed modes of operation and to switch between said modes; and a brake drive circuit for actuating the brake mechanism for a predetermined length of time when the operating section controls the transport device to cause tape motion to be stopped or tape speed reduced, wherein said predetermined length of time is the same every time the brake mechanism is actuated and is sufficient to enable the brake mechanism to stop the reel stands.

15. The device of claim 14 wherein the brake drive circuit includes:

a gating circuit for providing a control signal indicating that tape motion is to be stopped or tape speed reduced; and a charge-discharge circuit which receives the control signal and provides in response thereto a brake drive signal having a duration equal to said predetermined length of time.

16. The device of claim 15, wherein the charge-discharge circuit includes a capacitor to which the control signal is applied, wherein the brake drive signal is provided from the receipt of the control signal until the capacitor charges to a predetermined level.

17. In a tape transport device of the type including a pair of motor driven rotatable reel stands for carrying tape reels and a solenoid-actuated brake mechanism for applying a braking force to at least one of the reel stands, wherein the solenoid is energized during the entire time of application of braking force, the improvement comprising brake drive means for providing a control signal of fixed and constant duration for enabling power to be supplied to the solenoid for a predetermined limited amount of time whenever braking is to be achieved, wherein the duration of the control signal is sufficient to stop the reel stands.

18. The device of claim 17, including control means for controlling the motor driven reel stands to provide fast speed, normal speed and stop modes of operation of the reel stands, wherein upon a changeover from fast speed to normal speed operation the brake drive means initially enables power to be supplied to the solenoid, said brake drive means including delay means for subsequently initiating normal speed operation of the transport device after a delay which is greater than the predetermined limited amount of time.

19. In a tape transport mechanism having a plurality of operational modes including stop, play, fast forward, and rewind, and having a tape transport mechanism with a tape drive motor and a powered brake mechanism including electromagnetic actuator means which are energized during the entire time of the application of braking force, the improvement comprising:

first means for providing mode transition signals indicating the transistion from either (a) the play, fast forward or rewind modes to the stop mode, or (b) the fast forward or rewind modes to the play mode; and second means for energizing the brake mechanism only for a predetermined limited period of time upon occurrence of a mode transition signal, said limited period of time being the same each time the brake is actuated and sufficient for said brake mechanism to stop the movement of tape in said transport mechanism, said brake mechanism thereafter remaining de-energized until occurrence of a subsequent mode transition signal.

* * * * *